June 26, 1945.  G. G. BLUEMINK ET AL  2,379,273
REDUCTION GEAR ASSEMBLY
Filed July 24, 1942
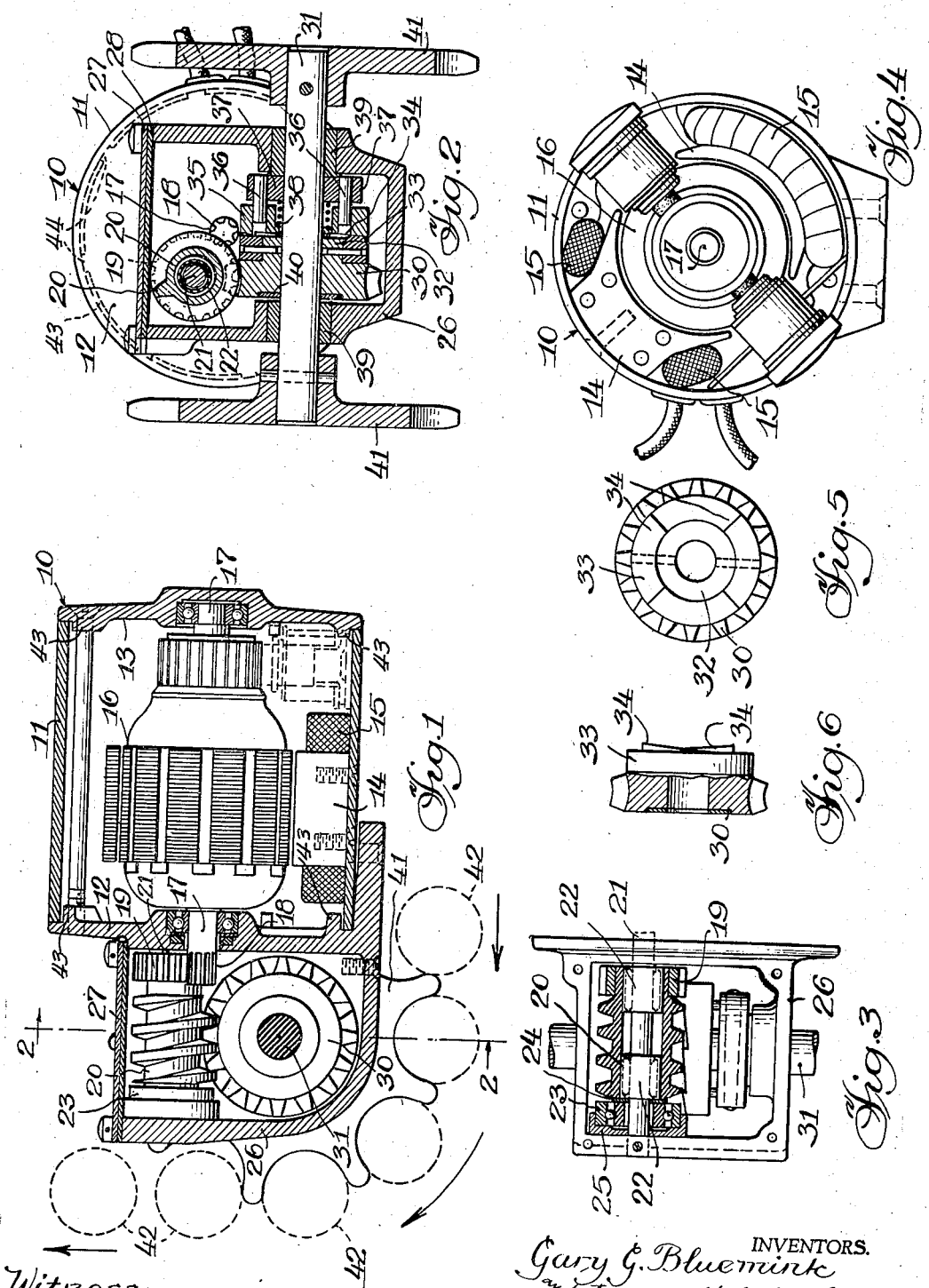
INVENTORS.
Gary G. Bluemink
James Holly Nelson
Chritton Wiles Davies & Hirschl Attys.

Patented June 26, 1945

2,379,273

UNITED STATES PATENT OFFICE 2,379,273

REDUCTION GEAR ASSEMBLY

Gary G. Bluemink and James Holly Nelson, Racine, Wis., assignors to The Dumore Company, a corporation of Wisconsin Application July 24, 1942, Serial No. 452,212

2 Claims. (Cl. 74—425)

This invention relates to improvements in reduction gear assemblies and particularly to a reduction gearing for a small motor, such as may be used for example as a machine gun ammunition booster.

The general object of the invention is to provide a reduction gearing by means of which a large amount of torque is available using a comparatively small assembly and particularly one employing a fractional horse power electric motor.

A contributory object is to provide equipment in which the driven gear in a worm and gear assembly is mounted to resist a large thrust and in which said gear has bearings within the same to permit mounting it in a small space.

A further object of the invention is to provide a reduction gear assembly in which the work shaft projects at right angles to the armature shaft to provide free ends on which sprockets may be mounted.

Various other objects and advantages will be apparent from the more detailed description which is hereinafter given of one embodiment of the invention.

In the drawing:

Fig. 1 is a central, sectional elevation through the reduction gear assembly with the motor armature shown in elevation;

Fig. 2 is a section on the line 2—2 of Fig. 1;

Fig. 3 is a top plan view, partly in section, of the reduction gearing without the motor;

Fig. 4 is an end view of the motor with the end plate removed;

Fig. 5 is an end elevation of a worm gear; and

Fig. 6 is a half section and half elevation of the same.

The motor, indicated as a whole at 10, comprises a length of cylindrical steel tubing 11 closed by end plates 12 and 13 bolted thereto. The pole pieces 14, 14 comprise metal stampings riveted together and secured to said tubing 11 by suitable screws. The coils or field windings 15 surround the reduced portions of the pole pieces and may be readily assembled thereon before the pole pieces are secured in position. In this way interference between the coils in placing them in the slots is overcome and each coil fits the core of the pole closely, which is important as the space at the ends is limited. This construction makes it possible to reduce the outside diameter of the motor for a given armature, or, conversely, permits the use of a larger armature than usual as compared with the diameter of the motor housing.

The armature 16 is mounted on an armature shaft 17, the latter having a pinion 18 at one end which is preferably integral with the shaft, i. e., it may be formed by cutting teeth in the end thereof. Said pinion meshes with a gear 19 on an extension or neck on the worm 20 and also is preferably integral therewith although shown as a separate element in Fig. 3.

In order to mount said worm in a small space longitudinally, a fixed shaft 21 is provided which extends through a central bore in the worm, the latter being mounted on needle bearings 22 of conventional form, between it and said shaft. At the left hand end of said worm as viewed in Fig. 3, a ball bearing raceway 23 is provided having a thrust washer 24 between the inner raceway and said worm to transmit the very considerable thrust which develops. The outer raceway is mounted in a bearing cup 25 positioned against a wall of the housing 26 which constitutes an integral extension of the end closure 12, bolted to the tube length 11, as shown in Fig. 1. Said housing 26 (Fig. 2) has a removable cover plate 27 and gasket 28.

The worm 20 meshes with a worm wheel 30 which is slidably mounted on the shaft 31 to a very limited extent and drives the same through a suitable clutch mechanism as follows:

Said worm wheel 30, as shown in Figs. 2 and 6, has an extenion or hub 32 thereon on which is non-rotatably mounted a clutch disk 33 having the usual inclined teeth 34 which mesh with corresponding teeth on the yieldingly mounted clutch disk 35. Said yieldingly mounted disk has a plurality of openings which receive pins 36 mounted in a hub 37 which is fixed on the shaft 31 whereby rotation of said worm wheel will drive said shaft in one direction through said cooperating clutch plates. Said plates are normally pressed together by a helical spring 38 to maintain said clutch teeth in yielding engagement. The shaft 31 is mounted in suitable bearings 39 arranged intermediate the ends of said shaft and a thrust washer 40 is positioned between the worm wheel and one of said bearings.

With the arrangement described above the ends of the shaft 31 project beyond the housing 26 in which it is mounted, and sprockets 41 are mounted on each end. As shown in Fig. 2, these sprockets are spaced apart sufficiently to clear the cylindrical housing 11. The space between the teeth on said sprockets are shaped to receive machine gun cartridges such as outlined at 42, the purpose of this embodiment of the invention being to serve as a machine gun ammunition booster to feed the flexible belt which contains said cartridges. The operator may pull said belt ahead when the motor is idle, by virtue of the clutch arrangement previously described. Each cartridge is considerably longer than the space between the sprockets 41. The arrangement described provides the necessary clearance so the said cartridge cannot interfere with any part of the housing as will be understood from Fig. 1 where the lower left hand end of the housing 26 is curved along an arc concentric with the axis of said sprockets.

It will be noted in Fig. 2 that there is a clearance between the left hand side of the thrust washer 40 and the adjacent bearing 39 which permits the spring 38 to maintain the slidable worm wheel 30 normally slightly to the left of its desired position. When the motor is operating, one of the components of the thrust developed by the worm gear results in forcing said worm wheel a little to the right against the action of said spring 38, thereby aligning said worm wheel accurately with the worm in the most effective operating position which is a position shown in said figure.

There is also a clearance between the inside surface of the tube 11 and the flange 43 which is formed on each of the end closures 12 and 13. Said flange has a plurality of radial projections or lands 44 thereon, shown in dotted lines in Fig. 2, which projections are formed when the parts are die cast and which very accurately center the armature shaft with respect to said tube 11.

When the device is mounted on a machine gun where the space is limited and where in other fields of service the available space is small, it is important to provide as compact a structure as possible without sacrificing effectiveness. The reduction gear assembly shown herein is very effective inasmuch as with a fractional horse power electric motor the torque delivered in inch pounds is practically double that which would be available using some of the standard constructions. The fact that the work shaft is supported between its ends is also important as it leaves said ends free for the two sprockets or other equivalent devices. If this shaft were merely a continuation of a main motor driven shaft, it would not be as feasible to mount two spaced sprockets on it without having an overhanging bearing. With the construction shown, the very substantial end thrust, which in the device shown in the drawing may be as high as two hundred pounds, is satisfactorily taken up.

We claim:

1. An electric motor and gear assembly as a unitary structure comprising a housing having a dividing wall providing two compartments, the walls of one compartment forming a motor casing, an armature shaft mounted in the opposite end walls of said compartment and projecting through said dividing wall, a pinion on the projecting end within the other compartment, a worm having another gear compactly disposed at one end thereof and meshing with said pinion, said worm having a central bore, a fixed shaft mounted in the walls of said compartment and passing through said bore, anti-friction bearings between said shaft and said worm and positioned within the longitudinal limits of the latter, means for taking up the thrust at one end of said worm, a shaft mounted intermediate its ends in said compartment walls to leave both ends free, and a worm wheel and cooperating clutch mounted on an intermediate part of said shaft and meshing with said worm to drive said shaft in one direction and permit said shaft to be rotated independently when said worm is idle.

2. A gear assembly comprising a fractional horsepower motor having a casing with a detachable end wall, an armature, and a shaft therefor, a gear housing of which said end wall constitutes a part, a pinion on said shaft, a worm having gear teeth at one end thereof meshing with said pinion, said worm having a central bore, a fixed shaft mounted in said housing and passing through said bore, anti-friction bearings between said shaft and said worm and entirely inside the latter to permit the use of a worm of minimum length, means at one end of said worm for taking up an end thrust in excess of one hundred and fifty pounds, and a shaft mounted in said housing intermediate its ends, projecting through opposite walls at both ends, and driven from said worm.

GARY G. BLUEMINK.
JAMES HOLLY NELSON.